E. A. BOHLMAN.
METALLIC POWER BELT.
APPLICATION FILED APR. 14, 1913.
1,106,356.
Patented Aug. 4, 1914.
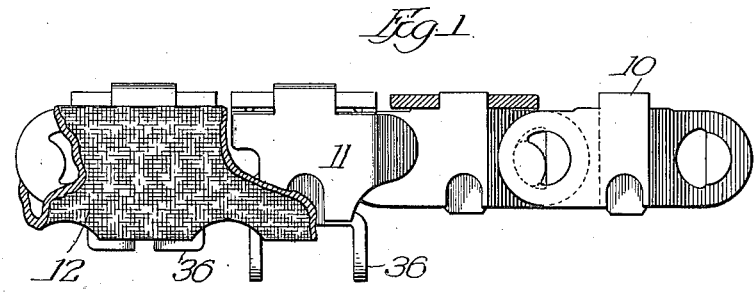
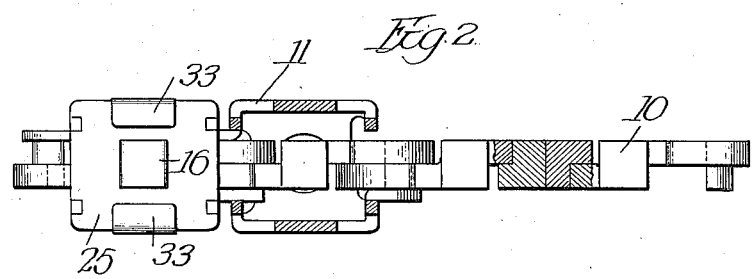
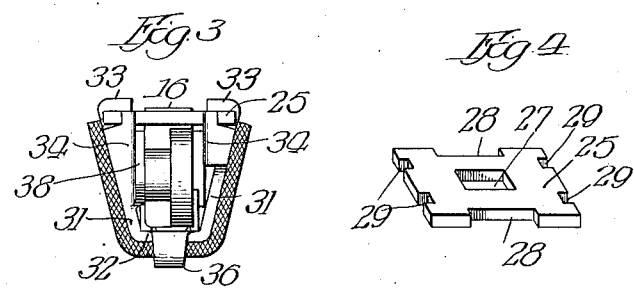
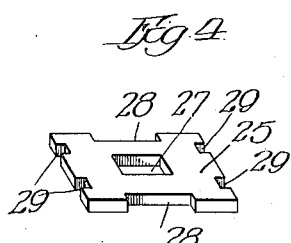
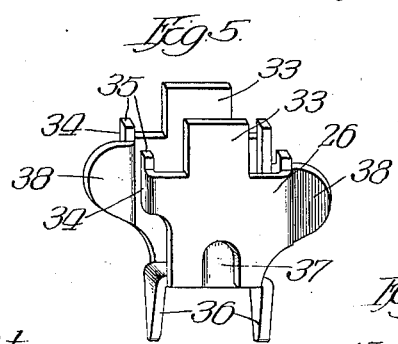
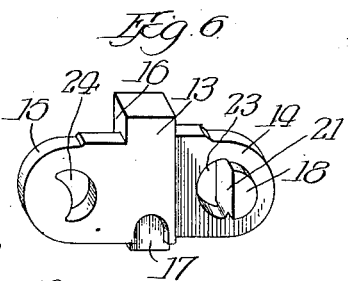
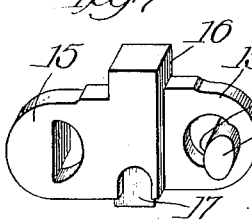

UNITED STATES PATENT OFFICE.

ERNEST A. BOHLMAN, OF CEDAR RAPIDS, IOWA, ASSIGNOR TO JAMES E. CAGNEY, JR., OF CHICAGO, ILLINOIS.

METALLIC POWER-BELT.

1,106,356.  Specification of Letters Patent.  Patented Aug. 4, 1914.

Application filed April 14, 1913. Serial No. 760,956.

*To all whom it may concern:*

Be it known that I, ERNEST A. BOHLMAN, a citizen of the United States, residing at Cedar Rapids, in the county of Linn and State of Iowa, have invented certain new and useful Improvements in Metallic Power-Belts, of which the following is a specification.

My invention relates in general to power belts for transmitting power from one machine element to another and more particularly to that class of belts known as metallic or chain belts, which are constructed for use in connection with light machinery such as the fans of automobiles and the like, and has for its principal object broadly to provide a belt which will be strong, durable and efficient, and at the same time sufficiently flexible to permit it to be used on pulleys of small diameter mounted closely together, the belt being adapted to run at high speed without danger of heating or sticking in the pulleys.

This invention has relation to the subject matter of my companion application, Serial No. 720,501, filed September 16, 1912, and presents another form of power belt of novel construction particularly adapted for use in light machinery.

A further object of my present invention is to provide a power belt which will be so shaped as to accurately fit the grooves of curved pulleys, the portions of the belt coming successively in contact therewith being exact duplicates of each other and all being accurately shaped and dimensioned.

A still further object of the invention is to provide a power belt consisting of a minimum number of parts of simple construction capable of being readily assembled with a minimum amount of labor thereby reducing the initial cost of manufacture and facilitating repairs.

Further objects and advantages of the invention will be apparent as it is better understood from the following description taken in connection with the accompanying drawing illustrating a preferred embodiment thereof.

On the drawing: Figure 1 is a partial side elevation of a power belt embodying my invention with parts broken away to show the internal construction thereof; Fig. 2 is a top plan view of the same also with parts broken away and removed for the same purpose; Fig. 3 is an end elevation of a disconnected end of the belt. Fig. 4 is a perspective view of the spacing member; Fig. 5 is a similar view of the embracing member which with a spacing member forms a frame or housing embracing a link as will be later described; and Figs. 6 and 7 are perspective views of the link taken from opposite sides.

A power belt embodying my present invention is composed primarily of a plurality of links 10, housings 11 and a friction strip 12. Each of the links 10 comprises a central portion 13 and integral offset ends 14 and 15. The central portion in the present embodiment of my invention is substantially square in cross-section and extends above the offset ends to form a projection 16 and is provided at its bottom at each side with a recess 17, the recesses 17 and the projection 16 being adapted to be engaged by the housing 11. Each of the ends 14 and 15 has a thickness preferably equal substantially to one-half the width of the central portion and is offset so that its inner face is disposed in the same plane with the inner face of the other offset end. Each end of the link is provided with a bearing stud 18, 19, preferably integral with the link. The bearing stud 18 of the end 14 is provided with a flat inner bearing surface 21 and the inner surface 22 of the bearing stud 19 of the end 15 is rounded. Between each stud and the central portion 13 is provided a recess 23, 24, the recess 23 being adapted for the reception of a stud 19 and the recess 24 for the reception of a stud 18 of the adjacent link. The outer boundary of each recess is disposed in the same plane with and is of the same shape as the adjacent face of its companion stud. When the studs 18 and 19 are positioned in the recesses of adjacent links with the studs of the adjacent links in the recesses 23 and 24, it will be noted that a rocking bearing contact is provided between each pair of links extending across the combined width of the two ends by the studs 18 and 19 contacting with the outer bounding surfaces of the recesses 23 and 24. As each of the ends thus connected is equal substantially to one-half the central portion 13 the bearing contact extends substantially across the belt proper.

The belt is given its V-shaped form by the frames or housings 11, one of which preferably embraces each link. These houses also serve to retain the links in interengagement.

Each housing 11 is preferably constructed of two parts, that is a top spacing member 25 and an embracing element 26. Through the center of each spacing member 25 is provided an aperture 27 adapted to snugly fit over the projection 16 of the central portion of the link. At each side the spacing member is recessed at 28 and at each end is provided with a pair of recesses 29 in all of which recesses the embracing element is secured. This element is preferably constructed of a single sheet of suitable metallic material bent to provide the inclined side walls 31 joined together at their base by the bottom portion 32. Upon the upper edge of each side wall is provided an upstanding ear 33 of a width substantially equal to the length of the recess 28 in the spacing member 25. The ends of each of the side walls are bent inwardly at 34 and each of these inwardly bent ends is provided with an upwardly extending ear 35 adapted to snugly fit companion recess 29 in the spacing member when the parts are assembled. The bottom portion 32 of the sheet forming the embracing element is extended longitudinally beyond the base of the side walls 31 and bent downwardly to form projections 36, the function of which will be later described.

The side walls are stamped inwardly adjacent their lower edges to provide vertically disposed ears 37 adapted to fit within the recesses 17 at the base of the central portion 13 of the link. One of the inturned ends 34 at each end of the embracing member is extended and bent outwardly to form a wing 38 extending longitudinally of the belt, the two wings 38 being arranged so that one wing is provided upon each side wall, as shown in Fig. 5. When the belt is assembled the links are first interengaged by inserting the studs 18 and 19 of the links in recesses 23 and 24 of adjoining links and the housings are then positioned by inserting the projection 16 through the aperture 27 of the spacing member and slipping the embracing element 26 up over the link from beneath so that the ears 37 engage within the recesses 17 of the link and the ears 33 and 35 are engaged respectively within the recesses 28 and 29 of the spacing member. The housing may be held in place in any preferred manner as by constructing the ears 33 of sufficient length to permit them to extend above the spacing member and bending them over onto this member after the parts are in position as shown on the drawing.

The housing is preferably given a sufficient length to permit the inturned ends to extend over the pivotal interengagement between the links. The wings extend oppositely from the ends of their housing, one being located upon each side wall, and overlie the pivotal connections with adjacent links. Two adjacent housings each, therefore, provide a wing overlying each end of the pivotal connection between the links embraced by these housings. The housings are so constructed that each wing extends into the next adjacent housing and passes the inturned end 34 which holds it in place over the pivotal connections and prevents it from being bent or distorted. At each pivotal connection, therefore, the housings of the two links connected coöperate to hold the links in intergagement.

In the present embodiment of the invention I provide a continuous friction sheet 12 which is disposed beneath the spacing members and embraces the outer face of each side wall 31. This sheet is retained in position by the projections 36 which are disposed through the sheet and bent toward each other as best seen in Fig. 1, although it will be apparent that each housing may be provided with an individual friction member and that this friction member may be of any desired form or construction and secured in any preferred manner without departing from the spirit and scope of the invention.

It will be obvious that a power belt embodying my invention may be cheaply constructed as the parts are simple in construction, few in number and easy to assemble. As the embracing elements which give the belt its V-shaped form are stamped from a single sheet of metal they may be cheaply and accurately formed as no milling is required in their construction. It will also be obvious that the belt may be taken apart for purposes of repair or to replace damaged members by merely bending the ears 33 to upright position.

It is thought that the invention and many of its attendant advantages will be understood from the foregoing without further description, and it will be apparent that numerous changes may be made in the form, construction and arrangement of the parts without departing from the spirit and scope of the invention or sacrificing any of its material advantages, the form hereinbefore disclosed being merely a preferred embodiment thereof.

I claim:

1. A power belt comprising a pair of inter-engaged links, the inter-engagement between the links constituting a flexible connection therebetween, having bearing surfaces throughout the aggregate width of the inter-engaged parts.

2. A power belt comprising a pair of inter-engaged links, the inter-engagement between the links constituting a rocking connection therebetween extending transversely through both inter-engaged links.

3. A power belt comprising a pair of links, each of said links being provided with a stud extending outwardly from its side and an aperture adjacent thereto through which a stud of the other link is disposed.

4. A power belt comprising a pair of interengaged links, each of said links being provided with a stud extending outwardly from its side and an aperture, the outer bounding face of said aperture being disposed in substantially a common plane with the inner surface of its stud and the stud on each link being disposed in the aperture of the other link.

5. A power belt comprising a pair of interengaged links, each of said links being provided with a stud extending outwardly from its side and an aperture adjacent each stud, a stud of one link having a rounded inner surface and a stud of the other link a flat inner surface and said stud of each link being inserted within the aperture of the other link.

6. A power belt comprising a plurality of flexibly connected links, a metallic housing embracing one of said links and having wings extending longitudinally of the belt over its connections with adjacent links and serving to maintain the connection between the links.

7. A power belt comprising a plurality of connected links, a metallic housing embracing one of said links and having a wing at each end extending longitudinally of the belt over the connection with an adjacent link and the two wings of the said housing being disposed on opposite sides of said belt.

8. A power belt comprising a plurality of rockingly connected links, a metallic housing embracing each of said links, one of said housings having a wing disposed longitudinally of the belt and extending over the connection between said link and an adjacent link and into the housing surrounding said adjacent link, said last mentioned housing serving to prevent displacement of said wing.

9. A power belt comprising a plurality of flexibly connected links, a housing embracing each link and having one end at each side turned inwardly and spaced from said link, the other end of the said side being formed into a wing extending longitudinally of the belt over the connection with the adjacent link and between said link and the adjacent inturned edge of its housing.

10. A link for a power belt comprising a body portion, ends extending oppositely from said body portion, each of said ends being provided with a bearing stud extending outwardly from its side and an aperture adjacent each of said studs.

11. A link for a power belt comprising a body portion, ends extending oppositely from said body portion, each of said ends being provided with a bearing stud extending outwardly from its side, the stud of one end being provided with a flat bearing surface and the stud of the other end with a rounded bearing surface.

12. A link for a power belt comprising oppositely extending ends, each provided with a bearing stud extending outwardly from the side of said end and an aperture located inwardly and adjacent each stud, the outer boundary of each aperture and the inner surface of its adjacent stud being disposed in a common plane.

13. A link for a power belt comprising oppositely extending ends, each provided with a bearing stud extending outwardly from the side of said end and an aperture located inwardly and adjacent each stud, the outer boundary of one aperture and the inner surface of its adjacent stud being disposed in a common curved plane and the outer boundary of the other aperture and the inner surface of its adjacent stud being disposed in a common flat plane.

ERNEST A. BOHLMAN.

Witnesses:
J. E. CAGNEY, Jr.,
H. F. LEDYARD.